United States Patent [19]

Grant

[11] Patent Number: 4,959,408

[45] Date of Patent: Sep. 25, 1990

[54] POLY(METHYL METHACRYLATE) BLENDED WITH A SOLID POLY(BUTYL ACRYLATE-CO-ALLYL ACRYLATE) PLASTICIZER

[76] Inventor: Frank O. Grant, 2600 Windy Hill Dr. Pepper Pike, Ohio 44124

[21] Appl. No.: 269,432

[22] Filed: Nov. 9, 1988

[51] Int. Cl.$^5$ .................. C08L 33/12; C08L 33/08
[52] U.S. Cl. ............................ 524/523; 525/224; 525/228
[58] Field of Search .............. 525/224, 228; 524/523

[56] References Cited

U.S. PATENT DOCUMENTS

| | | | |
|---|---|---|---|
| 3,461,188 | 8/1969 | Baer | 525/290 |
| 3,787,522 | 1/1974 | Dickie et al. | 260/836 |
| 3,988,392 | 10/1976 | Kameda | 525/224 |
| 4,460,742 | 7/1984 | Kishida | 525/228 |

FOREIGN PATENT DOCUMENTS 017247 2/1976 Japan .

OTHER PUBLICATIONS

Olabisi et al., "Polymer-Polymer Miscibility", Academic Press, N.Y., 1979, pp. 349-353, p. 338, pp. 233-237 and 271-272.
Ray A. Dickie, Mo-Fung Cheung & Seymour Newman, "Heterogeneous Polymer-Polymer Composites, II. Preparation and Properties of Model Systems", Journal of Applied Polymer Science, vol. 17, pp. 65 et seq.
C. J. Hooley, D. R. Moore, M. Whale & M. J. Williams, "Fracture Toughness of Rubber Modified PMMA", appearing in Plastics & Rubber Processing & Application, vol. 1, No. 4, (1981), pp. 345-349.
Clive B. Bucknall & Augusto Marchetti, "Kinetics & Mechanisms of Fatigue Damage in Rubber-Toughened Poly(methyl Methacrylate) (RTPMMA)", appearing in Journal of Applied Polymer Science, vol. 28, 2689-2700, (1983), p. 2690.
Clive B. Bucknall, Ivana K. Partridge & Mary V. Ward, "Rubber Toughening of Plastics, Part 7 Kinetics & Mechanisms of Deformation in Rubbertoughened PMMA", appearing in Journal of Materials Science 19 (1984), pp. 2064-2072.
Chem Abstract No. 163674u (vol. 96, 1982, p. 37) "Blends of An Acrylic Polymer and Impact Resistant Interpolymer".
Chem Abstract No. 4626x (vol. 94, 1981, p. 4657) "Polyester Molding Composition".
Chem Abstract No. 6495r (vol. 91, 1979, p. 75) "Fire--Protective Varnish Based on Water Glass".
Chem Abstract No. 199396q (vol. 97, 1982, p. 64) "Rubber Powder".
Chem Abstract No. 132860p (vol. 108, 1988, Index 16) "Impact and Weather-Resistant Blends of Acrylate-Acrylonitrile-Styrene Interpolymers Acrylic Resins and Acrylate-Based Impact Modifiers".
Chem Abstract No. 8277u (vol. 107, 1987, p. 46) "Manufacture of Polymer Microparticle-Containing Epoxy Resin Compositions".
Chem Abstract No. 217766s (vol. 97, 1982, p. 81) "Rubber Powder".
Chem Abstract No. 122716s (vol. 100, 1984, p. 78) "Sailcloth".
Chem Abstract No. 73995s (vol. 101, 1984, p. 62) "Multilayer Acrylic Polymer Emulsions".

*Primary Examiner*—John C. Bleutge
*Assistant Examiner*—David Buttner
*Attorney, Agent, or Firm*—Robert F. Rywalski

[57] ABSTRACT

Poly(methyl methacrylate) is plasticized by mechanically blending therewith effective plasticizing amounts of a non-volatile, solid, linear copolymer of butyl acrylate and allyl acrylate. Such blends are miscible as indicated by the lowering of the glass transition temperature of the poly(methyl methacrylate).

16 Claims, 1 Drawing Sheet

POLY(METHYL METHACRYLATE) BLENDED WITH A SOLID POLY(BUTYL ACRYLATE-CO-ALLYL ACRYLATE) PLASTICIZER

TECHNICAL FIELD

The present invention relates to polymeric blends and more specifically it relates to blends of poly(methyl methacrylate). Even yet more particularly the present invention relates to a miscible blend of polymethyl methacrylate with a solid high molecular weight plasticizer.

BACKGROUND ART

Poly(methyl methacrylate) is a well-known commodity polymer. It has been extensively used in a variety of applications ranging from glass window replacements such as, for example, in the aircraft industry and homes to other uses such as, for example, molded parts in automobiles like instrument cluster lenses, tailgate and parking light lenses, and sidemarker lenses. Because poly(methyl methacrylate) is a brittle material, having a glass transition temperature on the order of about 105° C., many uses for this material in the past have required either the use of plasticizers to make the material more pliable, and moldable, or have required the use of rubber modifiers to toughen the polymethyl methacrylate.

One of the many uses for poly(methyl methacrylate) is molded articles and one of the common techniques for forming such articles is injection molding. Generally, the rubbers that have been used to toughen the poly(methyl methacrylate) are not miscible with the material and, during the injection molding process, form highly visible and weak weld lines because of this immiscibility. Additionally, the molded products formed from rubber toughened polymethyl methacrylate, not infrequently, are characterized by relatively rough surfaces. The rubber toughened polymethyl methacrylates do not have a significantly altered glass transition temperature ($T_g$); consequently their molding time is relatively long and their molding temperature's high. Such rubber toughened materials are not conveniently used as films because they have high film forming temperatures.

The plasticizers which have been employed with polymethyl methacrylate are the traditional liquid plasticizers. In addition to not significantly altering the glass transition temperature of the poly(methyl methacrylate) these plasticizers unfortunately are relatively volatile. Consequently, depending on the use environment, it is not uncommon for these plasticizers to exude and evaporate from the molded article and unacceptably condense in the adjacent area. This, for example, quite frequently can happen with the plasticizers condensing on the interior windows and parts of an automobile.

Briefly, the essential problem in the past with the use of plasticizers and rubber toughened material is their inability to lower the $T_g$, their volatility, and immiscibility.

Rubber toughening can be attempted in two ways. First, the polymethyl methacrylate can be toughened by physically blending rubber materials. Another technique is to form a layered polymer by polymerizing methyl methacrylate as an outer layer.

The problems noted above are especially acute with respect to physical blends of polymethyl methacrylate with acrylate rubbers. Of course, those skilled in the art will readily appreciate that it is much more desirable to modify polymethyl methacrylate by the simple expedient of physical blending as opposed to the more complicated necessity of performing a multi-component and/or multi-step chemical reaction to form a different chemical reaction product.

Thus, from the foregoing, it will be seen that there is a need in the art to provide for a physically blended polymethyl methacrylate compound which produces a smoother surface as well as one that upon injection molding will produce a stronger and less visible weld line. Additionally it would be desirable if such polymethyl methacrylate could be modified so that it can be molded faster and at lower temperatures because it also has a lower melt viscosity. Similarly there is a need to provide such a modified polymethyl methacrylate with a lowered glass transition temperature because this will then allow the material to be formed, at lower temperatures, into molded articles for a wide variety of uses, as well as films. Such formulations could then be used, for example, as a silent paint because of the high absorption of acoustical energy. Finally there is a need in the art to provide for a material which can plasticize the polymethyl methacrylate and which is non-volatile.

DISCLOSURE OF THE INVENTION

Thus, in accordance with this invention, polymethyl methacrylate is plasticized by use of a high molecular weight plasticizer. This plasticizer is non-volatile and accordingly is not subject to the evaporation and condensation problems noted above. When molded the plasticized poly(methyl methacrylate) is capable of producing a smooth surface and, especially in the case of injection molding, produces less visible stronger welding lines. The presently plasticized poly(methyl methacrylate) can be molded faster and at lower temperatures and has a lower film forming temperature, making it especially well adapted for use as a paint.

Surprisingly and unexpectedly, and unlike other acrylate rubbers which have been used to toughen polymethyl methacrylate, the use of the present plasticizer, instead of increasing the impact strength of the polymethyl methacrylate, decreases it. The present plasticizer is miscible with the polymethyl methacryalte and is capable of significantly lowering the glass transition temperature by on the order of at least 70° to 75° C. and even more. This magnitude of the $T_g$ lowering is in marked contrast to the typical 10°–20° C. lowering obtained with prior art liquid plasticizers.

Thus, in accordance with the present invention, a composition of matter is disclosed which comprises a miscible blend of poly(methyl methacrylate) and a linear copolymer of butyl acrylate and allyl acrylate with the copolymer being soluble in methyl ethyl ketone. Generally the copolymer will be employed in an amount effective to lower the $T_g$ by at least about 70° C. and the blended composition will have no glass transition temperature higher than about 33° C. The amount of copolymer generally will be less than about 40% by weight and, typically, in the range of about 1% to about 40%, e.g. about 10–40% by weight.

Unlike U.S. Pat. No. 3,787,522, the present invention contemplates a physical or mechanical blend of separately pre-polymerized methyl methacrylate with separately and independently copolymerized butyl acrylate and allyl acrylate. That is the present blend is formed of two polymers polymerized remotely in space and/or time. The two polymers are physically, or mechanically, combined in any suitable manner such as, for example, in an emulsion or dispersion form or by hot melt blending techniques.

U. S. Pat. No. 3,787,522 relates to an acrylate polymer particle having a core of a crosslinked acrylic, a shell of polymethyl methacrylate, or a copolymer of methyl methacrylate with another monomer, and an intermediate portion formed from monomers like those used in the core and those in the shell. Presumably, crosslinking is attributable to the use of high initiator concentrations in the multi-step, or multi-stage, reaction process disclosed in this patent. It will be observed that Examples 1–5, of U.S. Pat. No. 3,787,522, use rubber phase initiator amounts of between about 0.55% (Example 3) to about 4.97% (Examples 4 and 5) by weight of initiator based on rubber monomers during the first reaction stage and use total initiator concentrations ranging from about 0.4% (Example to about 0.9% (Example 5). As is apparent a crosslinked material would, of course, be non-linear and insoluble. In contrast, the poly(butyl acrylate-co-allyl acrylate) material employed in the present invention is linear and soluble, as exemplified by its being soluble in the 2% to by weight range in methyl ethyl ketone.

DETAILED DESCRIPTION OF THE INVENTION INCLUDING THE BEST MODE OF CARRYING IT OUT

Figure 1:
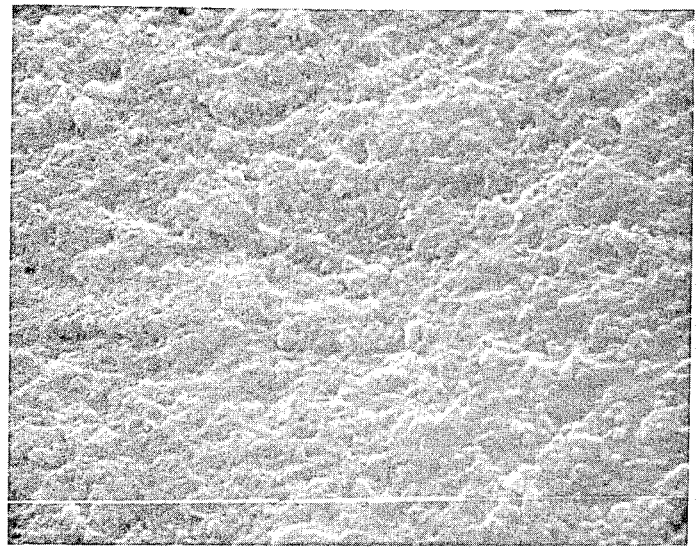

As indicated above, in the prior art, polymethyl methacrylate (PMMA) was toughened by the use of acrylate or acrylic rubbers. These toughening materials, however, were not miscible with the poly(methyl methacrylate) in that they did not lower the glass transition temperature of the PMMA although they did serve to increase impact strength. In contrast, the present blends exhibit a modest decreased impact strength by the addition of the poly(butyl acrylate-co-allyl acrylate) hereinafter PBAA. This, of course, is surprising in itself but more surprising is the unexpected finding that the PMMA modified with the PBAA produces miscibility, as evidenced by the fact that once combined the blend will be observed to have no glass transition temperature equal to (or greater than) that of homopoly(methyl methacrylate). The miscibility of the PBAA with the PMMA is thus illustrated by the lowering of the PMMA glass transition temperature. This lowering can be quite large and on the order of at least about 70° or 75° C. or more. This results in the blend having no glass transition temperature equal to that to the PMMA whereas, and in contrast, the prior art rubber toughened PMMA blends left an immiscible blend having at least two glass transition temperatures and one transition temperature was that of the polymethyl methacrylate, namely about 105° C.

The polymethyl methacrylate and the PBAA may be polymerized in a single step in accordance with conventional acrylic and addition polymerization techniques. Thus, suspension, emulsion solution and bulk polymerization may be employed but it is generally preferred to employ emulsion polymerization techniques. Similarly, the two independently polymerized polymers namely the PMMA and the PBAA may be blended in any conventional and convenient manner, either as a solution, a latex or as a melt as, for example, in a twin-screw extruder.

Methyl methacrylate is preferably polymerized in water using an emulsion technique. Desirably, the surfactant employed will be a non-ionic surfactant such as, for example, the alkyloxy poly(alkylene oxy) alkanols.

The materials commercially available under the trade designation Pluronics are suitable, as well as are other polyoxyalkylene derivatives of propylene and/or ethylene glycol. A particularly suitable non-ionic surfactant is tridecyloxy poly(ethylene oxy)ethanol. Additionally, suitable free radical initiators are employed, preferably a persulfate such as, for example, an ammonium persulfate. A redox accelerator will likewise preferably employed to reduce the reaction temperature to room temperature. Such redox initiators are well known with one suitable redox initiator being sodium meta-bisulfite. Desirably, a chain transfer agent will be employed in order to obtain moldable materials and in this respect the alkane thiols such as, for example, the $C_4$–$C_8$ alkane thiols are suitable. One especially desirable chain transfer agent is 1-hexanethiol.

Similarly, it is preferred to polymerize the PBAA using emulsion polymerization techniques. Desirably in preparing the PBAA, an anionic surfactant will be employed along with a free radical initiator, preferably a persulfate initiator. Generally no chain transfer agent will be employed. While it is preferred to employ a water soluble, or hydrophilic, persulfate as the initiator in forming the PBAA, oil soluble or water insoluble initiators may likewise be employed; if employed oil soluble initiators should be used in modest amounts so as not to form particles which are extremely large and unstable. Ammonium persulfate is the preferred initiator. The initiator is desirably employed in amounts of about 0.3% by weight, or less, based on rubber monomer and typically about 0.2% by weight. A preferred anionic surfactant is sodium lauryl sulfate although a wide variety of sulfates and sulfonates may be employed. Other suitable anionic emulsifiers include dioctyl sodium sulfosuccinate, and those commercially available under the designation Triton X-200, and Tergitol If a cationic emulsifier is desired for use, it is desirable to use hydrogen peroxide as the initiator because such emulsifiers traditionally react with persulfate salts.

In both instances, i.e. the separate, single step polymerization of the PMMA and the PBAA, conversions are desirably taken to 100%. This polymer conversion, as is generally known, can be calculated according to the following equation:

$$\text{Percent Conversion} = \frac{\text{Polymer Content}}{\text{Weight of Monomer} / \text{Total Weight}} \times 100$$
$$\text{in Recipe} \quad \text{of Recipe}$$

The amount of allyl acrylate and the amount of butyl acrylate employed in forming the PBAA may vary so long as the copolymer remains miscible with the PMMA as evidenced by the capability of decreasing the glass transition temperature of the PMMA. Suitably the allyl acrylate will be present in an amount of about 1 to about 50%, preferably about 10% and the amount of the butyl acrylate will be present in an amount of about 99% to about 50% by weight, preferably about 90%. The amount of PBAA employed in making the blend will generally be less than about 40% and typically in the range of 1 or 2% to about 40% preferably about 10% to about 40%.

While the above describes the present invention with sufficient particularity to allow those skilled in the art to make and use the invention further exemplification follows. The examples, of course, are not intended to be limiting but simply serve the function of even further demonstrating the present invention.

EXAMPLES

Preparation of Polymers

Polymethyl methacrylate was emulsion polymerized using 75 parts by weight of methyl methacrylate, 141 parts by weight of water, 8 parts by weight of surfactant [tridecyloxy poly(ethylene oxy)ethanol], 0.3 parts by weight of ammonium persulfate, 0.3 parts by weight of sodium meta-bisulfite, 0.2 ml of 1-hexanethiol and sufficient amount of acid to produce a pH of about 3 (in this case of four drops of sulfuric acid). Polymerization was conducted at 20° C. for approximately 50 minutes to obtain a conversion of 100%.

Standard bottle polymerization techniques were used to polymerize the methyl methacrylate. Emulphogene BC-840 (the surfactant) was weighed out in an eight-ounce bottle. Water was added and the surfactant solution was agitated for one hour so that the surfactant would be completely dissolved in water. Sulfuric acid drops were then added to the surfactant solution following by sequential additions of ammonium persulfate, methyl methacrylate containing 1-hexanethiol, and sodium meta-bisulfite. The polymerization mixture was purged with nitrogen for three minutes and capped with a butyl rubber lined cap. The screw-capped eight-ounce bottle was then placed in a water bath thermostatted at 20° C. and agitated for 50 minutes using end-over-end rotation.

The viscosity-average molecular weight of the synthesized PMMA was 118,000, the melt index (Condition I of ASTM D 1238) was 2.1. The Izod impact strength (ASTM D 256) was 21 J/m and the flexural modulus (ASTM D 790) was 2420 MPa. The viscosity-average molecular weight, $M_v$, was developed in the conventional manner using the formula:

$$logM_v = 1.316log[n] + 5.637 (25° C. \text{ in benzene})$$

wherein [n] is the intrinsic viscosity. In making the viscosity measurements, the concentration of the original polymer solution was about 1 gram per 100 milliliters of benzene and additional concentrations were prepared by successively adding 2, 3, and 4 ml. of benzene to 8 ml. of the polymer solution. A Ubbelohde dilution viscometer was employed.

The PBAA was similarly emulsion polymerized employing 64 parts by weight of monomer (in this case 10% of which was the allyl acrylate and 90% by weight of which was a butyl acrylate), 115 parts by weight of water, 0.13 parts by weight of ammonium persulfate and 0.94 parts by weight of sodium lauryl sulfate. After reaction to 100% conversion at 50° C. (about 18 hours) the particle size of the PBAA was about 80nm.

Preparation of the Blends

After completion of the emulsion polymerization of MMA, as described above, the latex was poured into a 400 ml. beaker and 5 grams of Triton X-202 dissolved in 15 ml. of water was added quickly to the magnetically stirred PMMA latex. This was done to delay the onset of latex particle aggregation long enough to now conveniently add the PBAA rubber latex. (Triton X-202 is an anionic post stabilizing surfactant. It is a 30% solution of sodium octylphenoxy polyethoxy ethyl sulfonate in water. During the mixing of the now combined PMMA and PBAA latexes, a coagulation medium was prepared by adding 1500 ml. of water to 150 grams of calcium nitrate in a four liter beaker. When all of the calcium nitrate dissolved in the water by mechanically stirring, 1500 ml. of isopropanol was added. Once the coagulating medium became clear, the mixed latex blend was added dropwise from a funnel. Mechanical stirring was continued for about 30 minutes after all the latex blend was coagulated. The resulting powder was allowed to settle to the bottom of the beaker overnight. The powder was filtered on a large Buchner funnel. After the liquid was completely filtered, the powder was immediately scraped into a four liter beaker and suspended, with mechanical stirring in 2 liters of water. After settling, the wash liquid was filtered off and the wash procedure was repeated. The powder was dried in a vacuum oven overnight at 90° C. and stored in a desiccator. The above procedure was repeated to produce samples containing 10%, 20%, 25%, and 40% by weight respectively of the PBAA based on the total weight of PBAA and PMMA.

Molding Test Pieces

The test pieces for mechanical property measurements were prepared by compression molding the dried powder between stainless steel plates backed with Teflon FEP 300A sheet in an electrically heated hydraulic press at 190° C. More than one addition stage was needed to fill the mold cavities. Each addition stage involved 10 minutes of heating the powder and 15 minutes of exposure to room temperature. A fluoropolymer mold release agent was used to help removal of the molded pieces. After the mold cavities were filled, the heater on the press was kept on for one hour with the platens closed. The heater was then turned off and the mold was allowed to cool down in the platens under pressure overnight. The mold was then removed from the press and the molded pieces were removed, the flash cut off with a scissors, and the edges smoothed first with coarse, and then with fine, sandpaper.

Izod Impact Strength Measurements

The toughness of a plastic is commonly measured by determining the amount of kinetic energy a polymer must absorb in order to fracture. The notched Izod impact test is a pendulum impact test which measures flexural impact strength. The impact tests were carried out on an Izod Impact Tester, Model TM 52004, made by Testing Machines Inc. The dimensions of the test specimens were 2-½ in. long, ½ in. wide, and ¼ in. thick. The specimens were notched on one thickness side to a depth of 0.1 inches, using a TMI Notching Cutter Model 43-15-1. The 2 ft-lb pendulum was calibrated by measuring the impact strength of Plexiglas VO44 and Plexiglas DR. The calibrated pendulum was released and allowed to break the specimen. The energy required to break the specimen was read directly in foot-pounds from the scale on the tester. The energy was divided by the previously measured thickness of the specimen to obtain the impact strength, expressed as foot-pounds per inch. Ten specimens were averaged to reach one impact strength value. Table I below summarizes the impact strength for various rubber contents.

TABLE I
IZOD IMPACT STRENGTH OF POLY(METHYL METHACRYLATE)-POLY(BUTYL ACRYLATE-CO-ALLYL ACRYLATE)BLENDS

| PBAA Rubber Content (%) | Impact Strength (J/m) |
|---|---|
| 0 | 21 ± 1 |
| 10 | 18 ± 1 |

TABLE I-continued

IZOD IMPACT STRENGTH OF POLY(METHYL METHACRYLATE)-POLY(BUTYL ACRYLATE-CO-ALLYL ACRYLATE)BLENDS

| PBAA Rubber Content (%) | Impact Strength (J/m) |
| --- | --- |
| 20 | 18 ± 1 |
| 25 | 17 ± 1 |
| 40 | 18 ± 1 |

It was quite surprising to find that the impact strength had decreased and then remained substantially constant.

Glass Transition Temperature

Differential scanning calorimetry (DSC) was carried out on a blend of the PMMA-PBAA powder which had been stored in the desiccator as noted above. The DSC measurement was made on the blend containing 40% by weight of PBAA. The PBAA used in that sample had a viscosity-average molecular weight of approximately 2,200,000. Two glass transition temperatures ($T_g$) were observed with the DSC. evaluation. One $T_g$ occurred at plus 33° C. and the other $T_g$ occurred at minus 33° C. This blend being evaluated was simply the blend that resulted from the physical admixing of two latexes and the polymers were not melt mixed; in other words, the powder were never taken above the softening or melting point. The plus 33° C. peak confirms that the $T_g$ of PMMA (105° C.) has been reduced and that plasticization has occurred as a consequence of the PBAA being miscible with the PMMA. The minus 33° C. peak is the $T_g$ for PBAA. Thus, although there are two glass transition temperatures it will be apparent that the glass transition temperature of PMMA has been significantly reduced; neither of the glass transition temperatures are even close to being equal to the $T_g$ of PMMA. Because of the great disparity in the molecular weight of PBAA (2.2 MM) compared to that of PMMA (0.118 MM) a portion of the PBAA apparently did not dissolve in the PMMA. Minimization of this molecular weight disparity, along with optimization of the quantities of rubber employed, is likely to result in a single $T_g$.

Fracture Surfaces

Articles molded from the PMMA-PBAA blend, were also studied by scanning electron microscopy (SEM). FIG. 1 is a micrograph of the fracture surface and it will be observed that it shows the absence of white rubber particles in the micrograph, thereby providing further evidence that the PBAA is miscible with PMMA. The textured surface provides evidence that rubber is present in the blend. The textured surface is the result of crack propagation through the rubber.

In a manner generally similar to the above, a PMMA blend was also made by blending a latex thereof with a latex of polybutadiene. The polybutadiene latex had a particle size of 320 nm. and was made by emulsion polymerization from a charge of 11.25 grams of a seed latex, 13 grams of butadiene, 27 5 grams of water, 0.063 grams of sodium oleate, 0.038 grams of potassium persulfate, 0.025 grams of t-dodecanethiol and 0.05 grams of potassium chloride. Polymerization time was 96 hours at 50° C. with a conversion of 73.% Further details may be found in my dissertation entitled *Structure-Property Relations In Rubber- Toughened Poly(Methyl Methacrylate)*, January 1988, available from the University of Akron. The dissertation is hereby incorporated by reference and specific attention is invited to page 68 and Table XXV.

Figure 2:
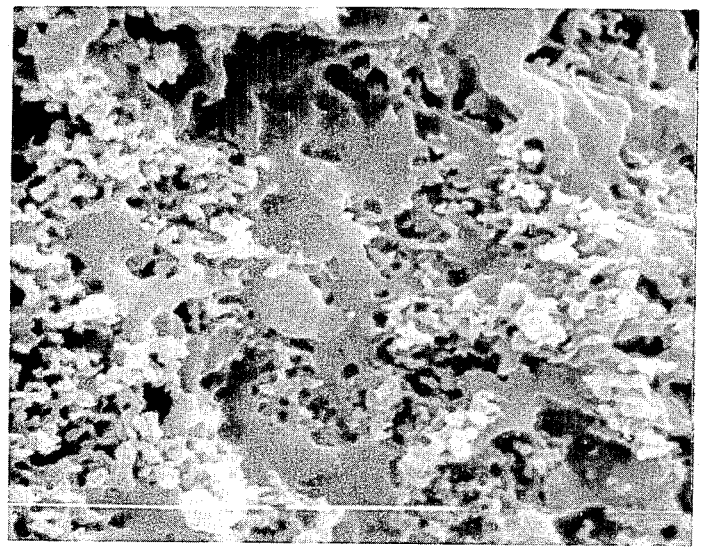

The blend was made to contain about 40% by weight of polybutadiene based on the total weight of polybutadiene plus PMMA. Test pieces were molded as above, Izod impacted and evaluated by SEM. The scanning electron microscopy micrograph of FIG. 2 shows the white rubber particles projecting from the surface. These rubber particles have been pulled out of the opposite half of the fracture surface and thus the micrograph indicates that separation occurred at the rubber-plastic interface. This consequently evidences that the polybutadiene and PMMA are not miscible. The smooth surface areas of FIG. 2 denote areas of plastic with no rubber because of immiscibility. A DSC. evaluation showed no decrease in the $T_g$. This, of course, is what is expected and generally known in the art that rubber toughened polymethyl methacrylate physical blends, although having increased impact strength, are not miscible with the PMMA and do not depress the glass transition temperature thereof. In short they do not plasticize PMMA.

Testing was also done with blends of polymethyl methacrylate with poly(butadiene-co-styrene) and poly(butyl acrylate) and poly(butyl acrylate-co-styrene) respectively. As would be expected, these blends all increased the impact strength of the polymethyl methacrylate which is in marked contrast to the observations obtained when employing the PBAA.

INDUSTRIAL EXPLOITATION

Because of the fact that blends of PMMA and PBAA result in a depression of the glass transition temperature of the PMMA, and are miscible, the blends of this invention will find utility as thin film coatings, for example, as a constituent in paints and also for a variety of molded objects. Of course, suitable adjuvants may be added to these blends such as, for example, colorants, fillers, reinforcing materials and the like. Thin films can be formed by simply applying aqueous dispersions of the blend onto a numerous and wide variety of materials including, for example, metals, wood, plastics and glass. Molded objects can be easily formed with conventional molding operations including, for example, extrusion and compression molding, but the benefits of the present invention will be especially outstandingly achieved when employing injection molding. In spite of the usual high shear rates encountered with injection molding, outstanding results are obtained as evidenced by stronger, less visible weld lines. Coatings and thin films may likewise be formed by applying these formulations in an organic solution such as, for example, a methyl ethyl ketone solution.

As has been indicated above, the blends of the present invention are easily made by simply first separately polymerizing methyl methacrylate to form polymethyl methacrylate and separately polymerizing the copolymers butyl acrylate and allyl acrylate to produce PBAA. These separately polymerized polymers can then be mechanically admixed in any convenient manner to produce the physical blends of this invention.

While the above describes the present invention it will, of course, be apparent that modifications are possible which pursuant to the patent statutes and was do not depart from the spirit and scope thereof.

I claim:

1. A composition of matter comprising a miscible physical blend of homopoly(methyl methacrylate) and a linear rubber copolymer consisting essentially of polymerized moieties of butyl acrylate and allyl acrylate, said copolymer being soluble in methyl ethyl ketone, said miscibility being evidenced in that the physical blend has no glass transition temperature equal to or greater than said homopoly(methyl methacrylate) and said blend showing a decrease in the impact strength of said homopoly(methyl methacrylate).

2. The composition of claim 1 wherein said copolymer is present, in an amount effective to lower the $T_g$ of said homopoly(methyl methacrylate) by at least about 70° C.

3. The composition of claim 1 wherein said blend has no glass transition temperature higher than about 33° C.

4. The composition of claim 2 wherein said copolymer is present in an amount of less than about 40% by weight.

5. The composition of claim 4 wherein said copolymer is present in an amount of about 1% to about 40% by weight.

6. The composition of claim 5 wherein said linear copolymer is formed from a mixture of butyl acrylate and allyl acrylate, and wherein the allyl acrylate is present in an amount of about 1% to about 50% by weight, based on the total amount of allyl acrylate and butyl acrylate.

7. The blend of claim 1 wherein said blend is in an aqueous dispersion.

8. A film formed of the composition of claim 1.

9. A molded article formed of the composition of claim 1.

10. The composition of claim 1 wherein said copolymer consists of said moieties of butyl acrylate and allyl acrylate.

11. As a composition of matter homopoly(methyl methacrylate) physically blended with effective plasticizing amounts of linear poly(butyl acrylate-co-allyl acrylate) rubber, said effective plasticizing amounts being sufficient to provide the blend with a glass transition temperature which is less than that of said homopoly(methyl methacrylate) and an impact strength which is less than said homopoly(methyl methacrylate).

12. The blend of claim 11 wherein said homopoly(methyl methacryalte) is polymerized at a pH of about 3 in the presence of a tridecyloxy poly(ethylene oxy) ethanol surfactant, a persulfate initiator, a bi-sulfite redox activator, and in the presence of a $C_4$-$C_8$ alkanethiol chain transfer agent, said reaction being done in an aqueous medium to form a pourable latex with 100% conversion and to provided a moldable material.

13. A method of decreasing the glass transition temperature of homopoly(methyl methacrylate) by the addition of a non-volatile rubber plasticizer, comprising physically admixing with a pre-polymerized homopoly(methyl methacrylate), effective glass transition reducing amounts of a separately pre-polymerized poly(butyl acrylate-co-ally acrylate) rubber, said effective glass transition reducing amounts also serving to decrease the impact strength of said homopoly(methyl methacrylate).

14. The method of claim 13 wherein said homopoly(methyl methacrylate) and said copolymer are separately and independently polymerized to a conversion of 100%.

15. The composition of claim 13 wherein said copolymer is present in an amount sufficient to lower the $T_g$ of said homopoly(methyl methacrylate) by at least about 70° C.

16. A method comprising polymerizing methyl methacrylate so as to form homopoly(methyl methacrylate) having a glass transition temperature of about 105° C.; in the absence of said homopoly(methyl methacrylate) and methyl methacrylate copolymerizing allyl acrylate and butyl acrylate simultaneously so as to form linear poly(butyl acrylate-co-allyl acrylate) rubber; and physically combining the above polymerized polymers so as to form a miscible blend having a glass transition temperature of less than about 105° C and having an impact strength which is less than that of said homopoly(methyl methacrylate) polymer.

* * * * *